United States Patent [19]

Dockter et al.

[11] Patent Number: 5,608,900
[45] Date of Patent: Mar. 4, 1997

[54] GENERATION AND STORAGE OF CONNECTIONS BETWEEN OBJECTS IN A COMPUTER NETWORK

[75] Inventors: Michael J. Dockter, Hollister; Joel F. Farber; Jeffrey D. Gordon, both of San Jose, all of Calif.; Kevin D. Seppi, Austin, Tex.; James C. Kleewein, San Jose, Calif.

[73] Assignee: Internationl Business Machines Corp., Armonk, N.Y.

[21] Appl. No.: 262,999

[22] Filed: Jun. 21, 1994

[51] Int. Cl.⁶ .................................................. G06F 17/30
[52] U.S. Cl. ...................................... 395/613; 395/200.09
[58] Field of Search ................................. 395/600, 650, 395/800, 325, 200.09; 370/94.1

[56] References Cited

U.S. PATENT DOCUMENTS

| | | | |
|---|---|---|---|
| 4,905,163 | 2/1990 | Garber et al. | 364/513 |
| 4,914,586 | 4/1990 | Swinehart et al. | 364/200 |
| 4,930,071 | 5/1990 | Tou et al. | 364/300 |
| 5,369,778 | 11/1994 | San Soucle et al. | 345/800 |
| 5,404,534 | 4/1995 | Foss et al. | 395/700 |
| 5,418,942 | 5/1995 | Krawchuk et al. | 395/600 |
| 5,421,008 | 5/1995 | Benning et al. | 395/600 |
| 5,423,043 | 6/1995 | Fitzpatrick et al. | 395/700 |
| 5,446,891 | 8/1995 | Kaplan et al. | 395/600 |

FOREIGN PATENT DOCUMENTS

| | | | |
|---|---|---|---|
| 467591 | 1/1992 | European Pat. Off. | 15/40 |
| 501770 | 2/1992 | European Pat. Off. | 15/419 |
| 483576 | 5/1992 | European Pat. Off. | 15/40 |
| 483577 | 5/1992 | European Pat. Off. | 15/40 |
| 10913 | 9/1990 | WIPO | 15/419 |

OTHER PUBLICATIONS

Anita Dennis, "Stylizing Long Documents? Framemaker 4.0 is for You", PC-Computing, vol. 6, No. 10, Oct., 1993, p. 84, Oct. 1993.

Myka et al., "Using Electronic Facimilies of Documents for Automatic Reconstruction of Underlying Hypertext Structures", Proceedings of the Second International Conference on Document Analysis and Recognition, 20–22 Oct. 1993, Tsukuba ScienceCity, Japan, Oct. 1993.

Susan Sirrine, "Framemaker 4 Builds on Solid Set of Tools", InfoWorld vol. 15, No. 52–1, Dec. 27, 1993, pp. 58–59. Dec. 1993.

Don Steinberg, "Demon Knowbots", PC–Computing, vol. 3, No. 1, Jan., 1990, pp. 135–136.

Anonymous, "Edify Information Agent Delivers information Across Networks", Software Magazine, May 15, 1992, vol. 12, No. 7 p. 58.

Anonymous, "Internet the Electronic Octopus", Information Industry Bulletin, vol. 8, No. 41, Oct. 29, 1992, pp. 4–8.

(List continued on next page.)

Primary Examiner—Thomas G. Black
Assistant Examiner—Paul R. Lintz
Attorney, Agent, or Firm—Randy W. Lacasse; David J. Kappos; Marily S. Dawkins

[57] ABSTRACT

A system and method for creating a knowledge base continuously developed through a method of repetitiously connecting various sources of locally and remotely located sources of data. The various sources of data can include reports, articles, books, audio recording, multi-media or computer data. The system uses a systematic approach of selecting a search criteria, selecting a set of search objects, identifying connections (relationships) between the search criteria and the search objects, creating an attribute (description of the relationship) and storage of the connection and its attribute. By following this approach additional connections can be made between already connected objects to exhaustively collect all possible relationships between objects. Through the use of unique identifiers the connections are made between systems located across networks. Unused cycle times of participating systems on the network are monitored and when sufficient cycles are present to perform connection searching the available system performs the connection process thus creating the knowledge base.

17 Claims, 7 Drawing Sheets

OTHER PUBLICATIONS

Oren Etzioni, "Building Softbots for UNIX", *Preliminary Report*, Department of Computer Science and Engineering, University of Washington, Seattle, Washington, Nov., 1992, pp. 1–19.

Larry Press, "The Net: Progress and Opportunity. (The Internet and The Global Network to Which it is Connected)", *Communications of The ACM*, vol. 35, No. 12, Dec., 1992, pp. 21–26.

Belki et al., "Information Filtering and Information Retrieval: Two sides of the Same Coin?", *Communications of the ACM*, vol. 35, No. 12, Dec., 1992, pp. 29–38.

Laurie Flynn, "Just Do It My Way: 'Intelligent Agent' Technology Learns to Compute the Way You Do", *San Jose Mercury News*, Jan., 24, 1993, pp. 2F–3F.

Mitch Ratcliffe, "General Magic Will Do Its Trick on Macs, PDAs. (Personal Digital Assistants)", *MacWeek*, vol. 7, No. 6, Nov., 1993, pp. 1–2.

Habermann, "The High Performance Computing and Communications Initiative in the US", Abstract only, *Proceedings ISADS 93. International Symposium on Autonomous Decentralized Systems*, Kawasaki, Japan, 30 Mar.–1 Apr. 1993, p. 10.

Obraczka et al., "Internet Resource Discovery Services", *Computer*, vol. 26, No. p, Sep., 1993, pp. 8–22.

Anonymous, "A Generalist's View of General Magic: My Visit to VapidWare", *P.C. Letter*, vol. 9, No. 7, p. 6.

D. Gaiti, "Intelligent Distributed Systems: New Trends", *Proceedings of the Fourth Workshop on Future Trends of Distributed Computing Systems*, Lisbon Portugal, 22–24 Sep. 1993, pp. 106–111.

Smalley et al., "AT&T TO Unveil On–Line Service Featuring Intelligent Agents", *PC Week*, vol. 10, No. 49, Dec. 13, 1993, pp. 1–2.

Marius Busuioc, "Distributed Cooperative Agents for Service Management in Communications Network", *IEE Eleventh UK Teletraffic Symposium. Performance Engineering in Telecommunications Networks*, Cambridge, UK, 23–25 Mar. 1994, pp. 24/1–24.7.

7.0 Appendix A. Related Industry Articles/Data, 7.1 Hypertext Requirements Gartner Groups Inc., 31 Oct. 1991, pp. 47–51.

GENERATION AND STORAGE OF CONNECTIONS BETWEEN OBJECTS IN A COMPUTER NETWORK

BACKGROUND OF THE INVENTION

1. Field of Invention

This invention relates in general to computer databases, and in particular to locating and generating connections between program objects and data objects distributed throughout a computer network.

2. Related Materials and Definitions

This application is related to the following applications which are hereby incorporated by reference:

UNIVERSAL TAG IDENTIFIER ARCHITECTURE (Application-07/963,885), now U.S. Pat. No. 5,414,841, issued May 9, 1995.

METHOD FOR ASSOCIATION OF HETEROGENEOUS INFORMATION (application Ser. No. 08/262, 838), pending.

FACILITY FOR THE STORAGE AND MANAGEMENT OF INFORMATION OBJECTS (NOUMENA SERVER) (application Ser. No. 08/263,146) now U.S. Pat. No. 5,557,790.

FACILITY FOR THE INTELLIGENT RETRIEVAL OF INFORMATION OBJECTS (PERSONA) (application 08/262,834), pending, FACILITY FOR THE STORAGE AND MANAGEMENT OF CONNECTIONS (CONNECTION SERVER) (application 08/267,022), pending.

METHOD FOR STORING AND RETRIEVING HETEROGENEOUS CLASSIFICATION SYSTEMS (application 08/263,379), pending.

The following definitions may be helpful to the understanding of the basic elements of each of the copending application:

Tags: Tags are globally unique identifiers. Tags are sequentially numbered identifiers identifying data objects (i.e. video, text, audio, observations, opinions, etc.)

Phenomena: The logical structure of the system begins with a unit of human perception, the "phenomena". In the universe of a computer system, "Phenomena" is defined as a representation of phenomena which exist in the universe of human experience. Phenomena can be ideas, written matter, video, computer data, etc. Examples include viewing a computer file using a wordprocessor, watching a digital video clip or listening to a digital video segment.

Connections: That which gathers (or links) Phenomena into interrelated collections. Connections are that which lead the user from one Phenomena to another Phenomena. Connections are not simply a road-map from a Phenomena to all other Phenomena. More specifically, Connections represent an observation of related Phenomena made by human or by computer observers.

Connection Attributes: In the logical structure of the system, "Connection Attributes" allow the entire network of Phenomena and Connections to become usable to each user of the system. Connection Attributes store the rationale behind each connection. In fairly generic terms, Connection Attributes describe the Who, What, Where, When and Why of a particular observation.

Noumena: Another concept in the logical structure of the system is "Noumena". Noumena are that which lie beyond the realm of human perception. In computer-based systems, such as the instant invention, they are the computer stored data, examples are "computer files" or "datasets". When these computer files, the Noumena, are observed in their "raw" form, they do not resemble pictures, sounds, nor words. These Noumena resemble a series of bits, bytes, or numbers. These computer files must be manipulated by computer programs, "Phenominated", to become as they appear to the observer. In the present system, Noumena are all of the generic format computer files needed to produce a representation of a Phenomena. This includes the computer data files as well as the computer program files.

Grinding: Grinding is a systematic, computer-based observation of Phenomena. This is typically done with a "narrow view". The programs are usually looking for well defined criteria. When Phenomena are observed by the computer programs, the programs make Connections between the observed Phenomena and other Phenomena known by the programs. In effect, acting as a human observer would when viewing a Phenomena and manually Connection it to other Phenomena.

Persona: to determine the value of information based on each user's subjective preferences.

Capture: During knowledge capture, the human or computer observer Connects two Phenomena and provides the rationale for the Connection by supplying Connection Attributes. The user can also Connect a new Phenomena to previously existing Phenomena.

Retrieve: During knowledge retrieval, an observer navigates from Phenomena to Phenomena via Connections. Knowledge is delivered by experiencing the reconstituted Phenomena. Which knowledge is delivered is controlled by the Connections and the assessment of the Connection Attributes, preferably under the auspices of a Persona.

The present invention supports the overall system of copending application "Method for Association of Heterogeneous Information" It supports the Tag Architecture, Connection Server, Grinding, Noumena Server and the design and infrastructure of the overall system, but is not limited thereto. The term "Phenomena" could be read "object", and the term "Connection" could be read "link" in this disclosure. The distinction between Noumena and Phenomena is made to distinguish between objects as experienced by users (Phenomena) and objects as they are actually stored (Noumena).

The amount of information available in computer databases is expanding rapidly. Additional information is rapidly coming on-line in the form of images, audio and text files. One of the major problems facing the user of a computer system, which has access to large amounts of data, is locating relevant information. The process of locating information is at best very time consuming, as a user requires many computer processor cycles with frequent I/O transmissions. This problem is further exacerbated in modern computer networks where much if not all of relevant data is remote from the user's computer. Worse still though, the user frequently will have access to enormous amounts of data that which he or she is not even aware or of which he or she does not have the capability to search. This data is thus useless to the computer user.

In the prior art, numerous techniques have been implemented to ameliorate the above described deficiency. The most widely used approach has been manual, human initiated search efforts which attempt to correlate data objects to one another. Increasingly however, as volume of accessible information explodes, the human search effort required to manually correlate large amounts of existing information is too expensive, too error prone, and too time consuming.

To cope with the inability of manual, human searching to create the required correlations necessary as the basis for meaningful access to data, recent attempts have been made at automating these search processes. These systems generally employ the generation of hyperlinks in hypermedia using authoring tools. However, these systems suffer several shortcomings which render them inadequate for general purpose use in a computer network housing large quantities of distributed data. First, the volume of potential hyperlinks is large and the manual generation process used by these systems is slow, costly, inefficient and error prone, and thus can only accommodate a small percentage of the available input. Second, these systems are normally static; that is, they are executed once against the data at a single instant in time. Thus, they are unable to respond to updates in the data or to the existence or nonexistence of connections in the data. Third, the manual link generation attempted by these systems is subjective and dependant upon the ability, point of view, and value judgements of the author. The possibility exists that an author might forget the association between some objects over time as memory diminishes, or miss a connection due to boredom, fatigue, distractions, etc. Finally, these systems have no ability to record additional information regarding the connections they create so as to enable a future user to establish why a connection was created.

3. Discussion of Prior Art

HYPERTEXT/HYPERMEDIA

Hypertext, and its multimedia counterpart hypermedia, are methods used by programmers to interconnect references to additional related sources. Hypertext programmers usually store maps of selected links for a particular application within the application itself. These are "closed" systems with no external API's to add links from outside their application. Additional limitations of Hypertext are its static authoring linking process, rapid development of large volumes of data and its inability to crosslink easily to remotely located, and incompatible, sources of information. The most beneficial uses of hypertext/hypermedia are restricted to the workstation level.

Entity-Relationship model

Chen developed the "Entity-Relationship Model". Chen sought to model the relationships universal to a class of entities. His goal was to unify data models for the rigid, predefined, structure provided in database systems. The system fails to provide for a dynamic individualized method to interrelate instances of information, but rather is directed to relating entire classes of information.

Accordingly, the prior art has heretofore failed to address the need for a connection generating process capable of generating large numbers of connections exhaustively, automatically and without the need for manual intervention, in advance of queries for them. Moreover, the prior art has failed provide a connection generating technique which uses multiple passes to search for additional connections whose existence is suspected based on already located connections into research objects for additional connections after those objects are modified. Finally, no method has yet been created in the prior art for storing connections in association with the connected objects to permit future reference to and use of the connections.

4. Objects of the Invention

It is the object of the present invention to create connections between data objects.

It is further an object of the present invention to store said representations of said connections.

It is further an object of the instant invention to create multiple connections.

It is further an object of the present invention to dynamically create said connections.

It is further an object of the invention to create said connections based on human/computer generated search criteria.

It is further an object of the present invention to create said connections exhaustively within a defined scope.

It is further an object of the present invention to make the present connection processes work across networks.

It is further an object of the present invention to perform the connection creation process with as little interruption of normal system processes as possible.

These and other objects will be discussed hereafter as they relate to the drawings, detailed specification and claims.

SUMMARY OF THE INVENTION

The system of the present invention provides for a method of connecting various sources of locally and remotely located sources of data. The various sources of data may include, but are not limited to, reports, articles, books, audio recording, multi-media or computer data which may be distributed across computer networks.

The invention uses a systematic approach of selecting a search criteria, selecting a set of search objects, identifying connections (relationships) between the search criteria and the search objects, recording connection attributes (description of the relationship) and storage of the connection and its attributes. Iterative replication of the connection process can be used to exhaustively collect all possible relationships between objects within selected sets. The collected knowledge created by having a body of connections for a particular subject allows the user access to both foreseen and unforeseen relationships creating an immensely powerful research tool.

Each object in the network is given a unique identifier to allow for transportability between locations and systems allowing the present invention to be compatible across networks. The system tracks unused cycle time of participating systems on the network and when sufficient cycles are present to perform connection searching the available system performs the connection process with storage of the results to ultimately create a massive database of connections without the requirement of having to store the actual data contained within the objects. Future requests for information can be quickly satisfied as the locations and attributes of connected data are immediately available.

DETAILED DESCRIPTION OF INVENTION

Figure 1:
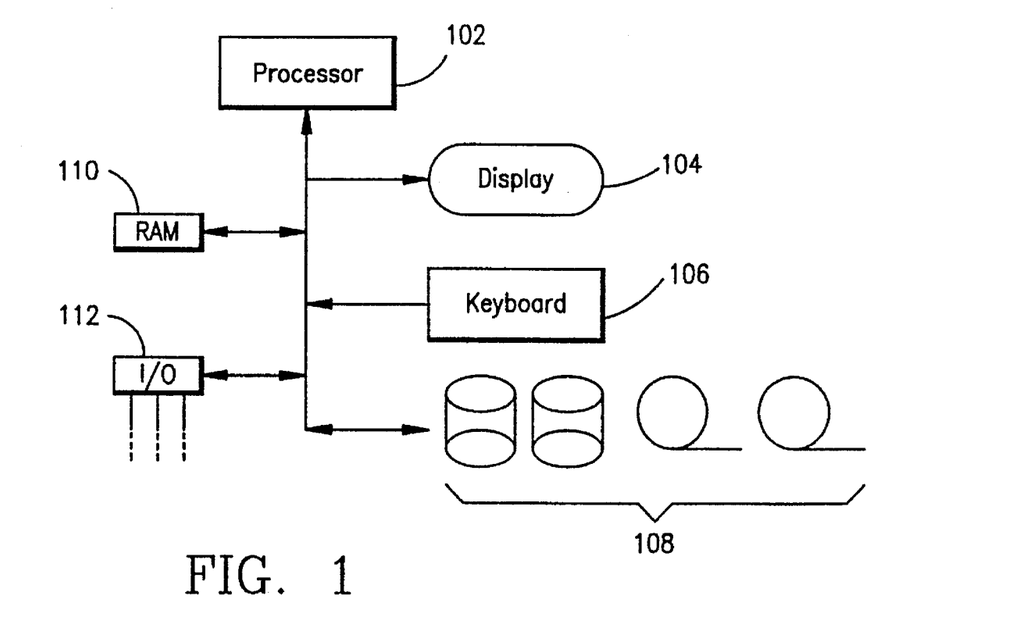
FIG. 1 is a block diagram illustrating a computer system for generating connections in accordance with the present invention.

FIG. 1 illustrates a computer system configured for generating connections in accordance with the present invention. The system includes processor 102, display 104, keyboard 106, storage subsystem 108, random access memory (RAM) 110 and I/O channels 112. In operation, a user enters commands at keyboard 106. Processor 102 executes instructions and operates on data stored in RAM 110 and/or disk and/or tape subsystem 108. System responses in information are presented to the user on display 104. I/O channels 112 communicate with other systems to form a computer network, as will be discussed in more detail subsequently.

Various objects, including computer programs, text files, image files, audio files, all of arbitrary size, are stored in storage subsystem 108. Other systems accessible via I/O channels 112 may also have objects housed in their local storage banks. In accordance with the present invention, a schema is provided, as will be described in detail below, which searches for associations or "connections" between objects within a single system and those distributed over the network, and records them for future reference upon user or system request.

Figure 2:
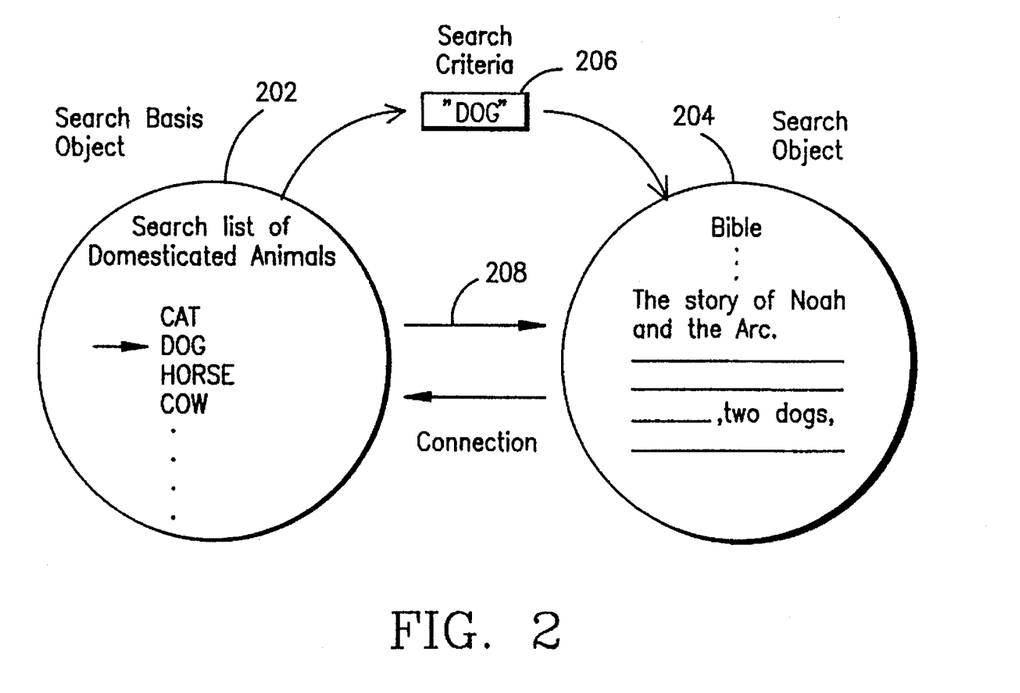
FIG. 2 is a depiction of a connection generated between objects.

Shown in FIG. 2 is an illustration of the basic object connection structure provided in accordance with the present invention. The figure includes search basis object 202, search object 204, search criteria 206 and connection 208. The fig. illustrates a typical scenario for the construction of a connection between objects. Initially, no connection exists between objects 202 and 204. In the particular example shown, object 202 consists of a search list of domesticated animals. Specific animals included in the list are cat, dog, horse, cow and others. Object 204 may contain the entire text of the Bible, or perhaps any portion thereof. A process or user, not shown, determines that it is desirable to search for instances of the search list entries in the Bible. Based on this requirement, object 202 is established as a search basis object while object 204 is established as a search object. The distinction between the objects is that the search basis object provides the specification or source for the search criteria 206, while the search object is that object to which the search criteria is applied in an attempt to locate connections. In the example shown, the particular search criteria to be located in search objects 204 is the animal "dog", shown within search criteria 206. The choice of this particular domesticated animal may be reflective of a specific user request, a specific program request or simply an interactive search through search basis object 202 starting at cat and proceeding through cow and to domesticated animals beyond. In the simple example depicted, search object 204 is keyword searched using well known prior art techniques for instances of the character string dog. At least one instance of the search term or search criteria may be found in the Holy Bible, for instance in the story of "Noah and the Ark". Upon finding the search criteria in the search object, in accordance with the present invention, a connection is created between search basis object 202 and search object 204. Further examination of FIG. 2 reveals several important aspects of the present invention which will be described in more detail subsequently. First it is apparent that there are three scenarios in which connections may be generated: one, where the origination set is known and it is desired to locate connections from the origination set; the second, where the destination set is known and it is desired to locate connections to the destination set; and third where neither the destination set nor the origination set is known, but it is simply desired to search for connections between two data objects. All three of these scenarios are addressed by the present invention.

A second aspect to be noted in FIG. 2, is that an object can be defined on any scope. Thus, an object can contain a single term such as dog or an entire table such is as shown in search basis object 202, or an entire document such as shown in search object 204. Additionally, as will be seen below, an object may consist of a process, an image file, an audio file, or any other body of data. To provide complete flexibility, connections may be made between objects defined on any one of the above scales. Thus, a single term such as dog may be connected to an entire document, or two documents may be connected to one another, or a document may be connected to an image file, or a search list may be connected to a process or any combination of the above. Further, because objects include processes, connections may be made to processes which search for additional connections. This aspect of the present invention, which will be described in greater detail below, enables a first connection generating process to connect a search object to a second connection generating process which is determined to be particularly applicable to the search object. Thus, once a first connection generating process discovers a connection to the word dog in search object 204, it may connect search object 204 to a second connection generating process which is designed to look for specific information regarding "dog".

Another aspect, derived from the fact that objects need be defined at any level of granularity, is that connections may be created to objects or into objects so as to attach to smaller objects within larger objects. In the example given, a connection may be created between search basis object 202 generally and search object 204 generally or between the story of Noah's Ark which would be defined as its own object within search object 204 and search basis object 202, or between the story of Noah and the Ark and the particular search criteria "dog", which is defined as an object within search basis object 202, etc.

Finally, it is to be noted from FIG. 2 that connections may be generated in either direction or in both directions between connected objects. Thus, in the example, the connection may be established from dog to Bible or from Bible to dog.

Figure 3:
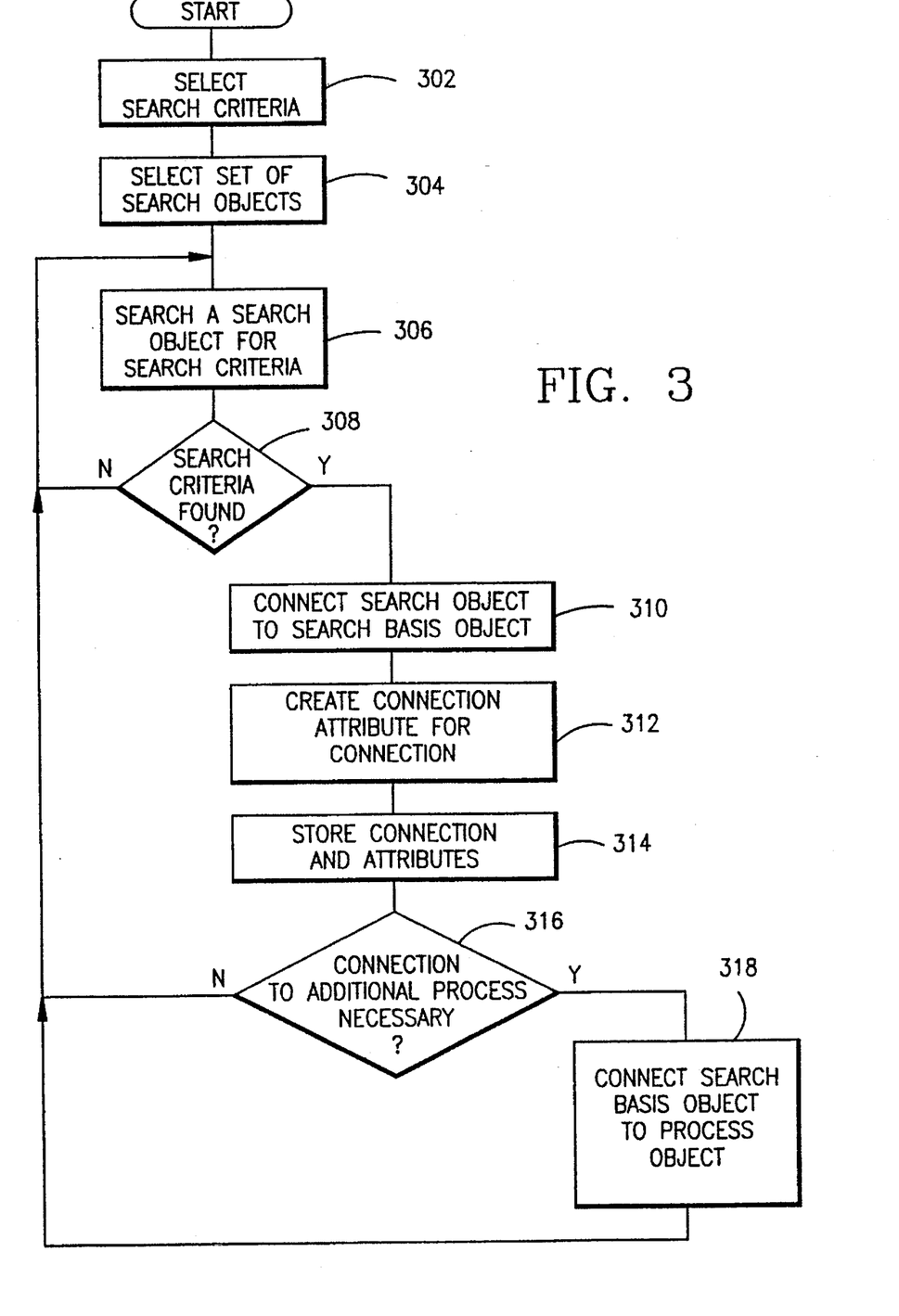
FIG. 3 is a flow chart illustrating the process for generating connections.

Shown in FIG. 3 is a flow chart illustrating the process for generating connections is accordance with the present invention. At 302, a search criteria is selected based on some processing of a search basis object. The processing may be a trivial selection of a search word or a term from a list. Alternatively, it may include more sophisticated analysis such as color extraction from an image object. Once the search criteria is selected, at 304, a set of search objects are selected. The set may include one object item, a document, a volume of data, multiple volumes of data, images, audio, processes, etc. The only requirement on the set of search objects is that it be identified as a possible basis for some connections. Further, it is to be noted that both the search criteria and the search objects may be provided while alternatively only one may be provided or further alternatively neither may be provided.

Given the search criteria and the set of search objects, at 306, the search is conducted on a search object to locate an instance of the search criteria. The search may be trivial in nature such as a key word search or it may be more sophisticated such as pattern matching on an image or voice recognition on an audio file. At 308, if the search Criteria is not found, the process continues by returning to 306, selecting another search object and once again searching for instances of the search criteria is found at 308, processing continues at 310, where a connection is established between the search object and either the search basis object or another designated object. The direction of the connection may be based on a directive from the process or user requesting the connection. Next, at 312, connection attributes may optionally be created for the connection. The connection attributes can describe any desirable information concerning the connection. The attributes may simply state that the search object is an example. In the preferred embodiment, the attributes describe the destination of the connection. At 314, the connection and the attributes, if any, are stored in logical association with connection.

Next, at 316, it is determined whether the connection has invoked the need for an additional connection to a specialty connection generating process whose function may be to search for additional connections related to the first connection. If no such process is implicated, processing returns to 306, where a new search object is selected. If an additional process is implicated, processing continues at 318, where a connection is established between the search basis object and the newly implicated process object. Additionally or alternately, a connection is established between the search object and the newly implicated process object. The result of establishing the connection between the search basis object and/or the search object and an additional connection generating process is that process becomes a candidate for another search. These searches may be dispatched immediately in nested fashion, or alternatively may be scheduled for later dispatch in execution. Also, it is to be noted that additional or different search criteria may be used in the subsequent search.

Finally, it is to be noted in general with reference to FIG. 3 that trivial aspects of the algorithm have been omitted. For instance, in accordance with normal programming fashion, it is clear that the search must be exited when data is exhausted. Such aspects are omitted for the sake of brevity, but are intended to be accomplished using processes well known in the art.

Figure 4A:
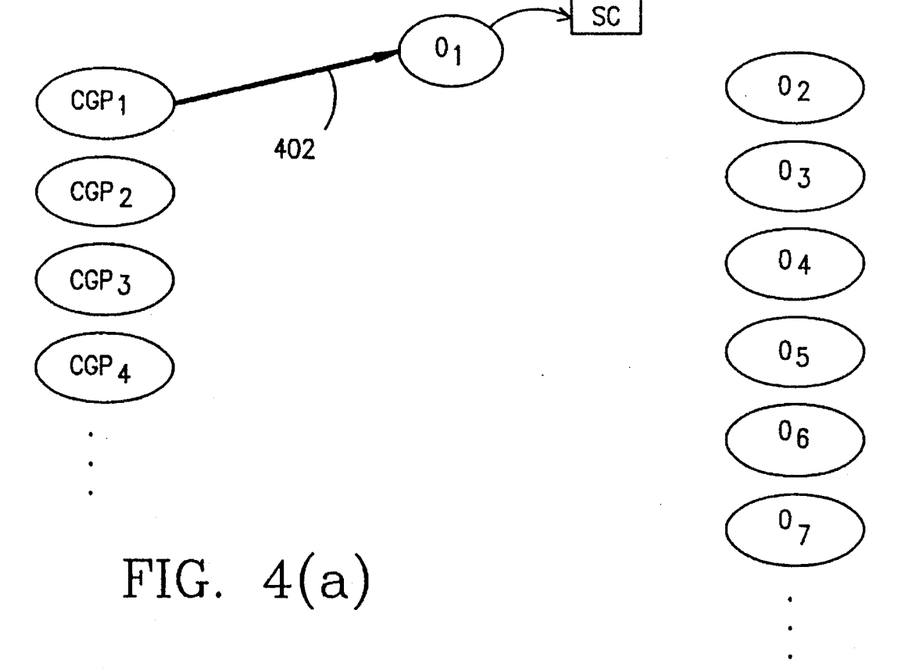
FIGS. 4a, 4b, 4c and 4d depict a progression of connection generating process identifying connections between objects.

Shown in FIGS. 4a through 4d is an exemplary sequence of connection generating processes being scheduled and dispatched to locate connections between a set of data objects. With particular reference to FIG. 4a, a connection generating process designated as $CGP_1$ is initiated to search for connections from object $O_1$ to objects $O_2$, $O_3$, $O_4$, $O_5$, $O_6$, $O_7$ and potentially additional objects. Initially, at 402, object $O_1$ is used to create a search criteria labeled SC. This search criteria will be the basis for identifying connections to objects $O_2$ through $O_7$. It is to be noted that objects $O_2$ through $O_7$ may be data objects or process objects of any kind, provided they are compatible with a connection generating procedure such that they can be meaningfully searched. The connection generating procedures are also considered to be objects; however, they are shown separated from objects $O_1$ through $O_7$ in FIGS. 4a through 4d for ease of identification and for purposes of illustration as will become more apparent.

Figure 4B:
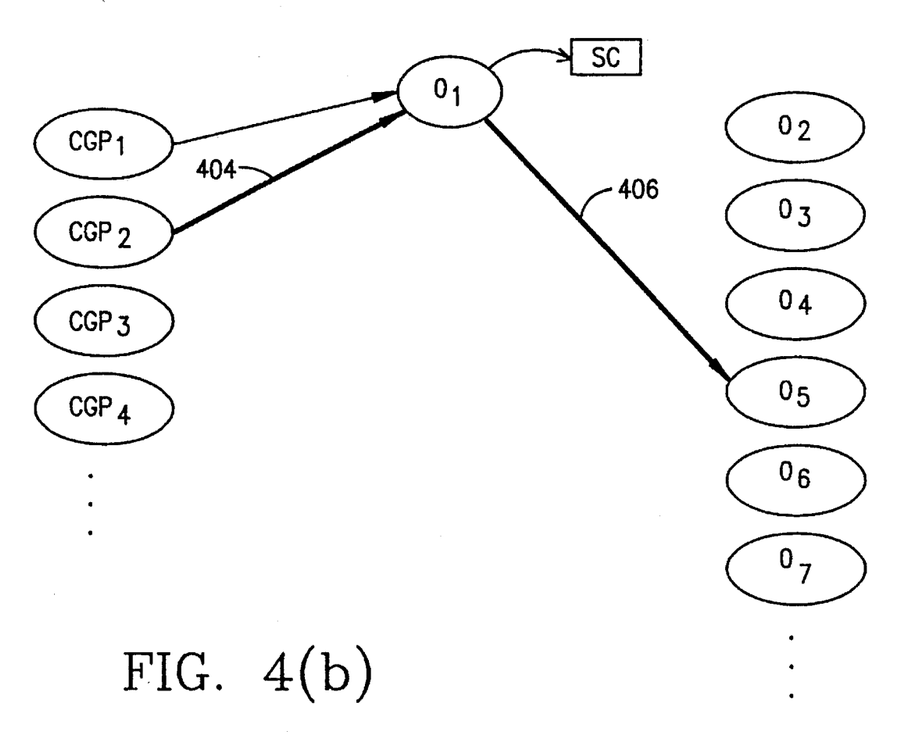

FIG. 4b shows the result of $CGP_1$ searching for instances of the search criteria in objects 2 through 7. $CGP_1$ creates two connections, one from $O_1$ to $O_5$, labeled 406, which designates that the search criteria was found in $O_5$, and one from $CGP_2$ to $O_1$, labeled 404, because the subsequent scheduling of a second connection generating process ($CGP_2$) to search for additional connections between $O_1$ and $O_2$ through $O_7$. The arrows on 404 and 406 designate directions of reference for the connections, indicating a connection from $O_1$ to $O_5$ and from $CGP_2$ to $O_1$.

The connection between $CGP_2$ and $O_1$ is created to cause follow-up, or secondary searching for additional connections in a specific discipline when it is discovered that an object may contain information pertaining to that discipline. Thus, for example, if a connection generating process which is designed to generate connections on the basis of keyword searching finds a connection based on the name (Abraham Lincoln) it may, in addition to creating the keyword connection, connect the object to a specialty connection generating process designed to perform additional searching for connections involving U.S. Presidents. This specialty searching may also be keyword searching, but involving different keyword or additional objects. Alternatively, it may involve more sophisticated searching such as knowledged based or inference based searching.

Figure 4C:
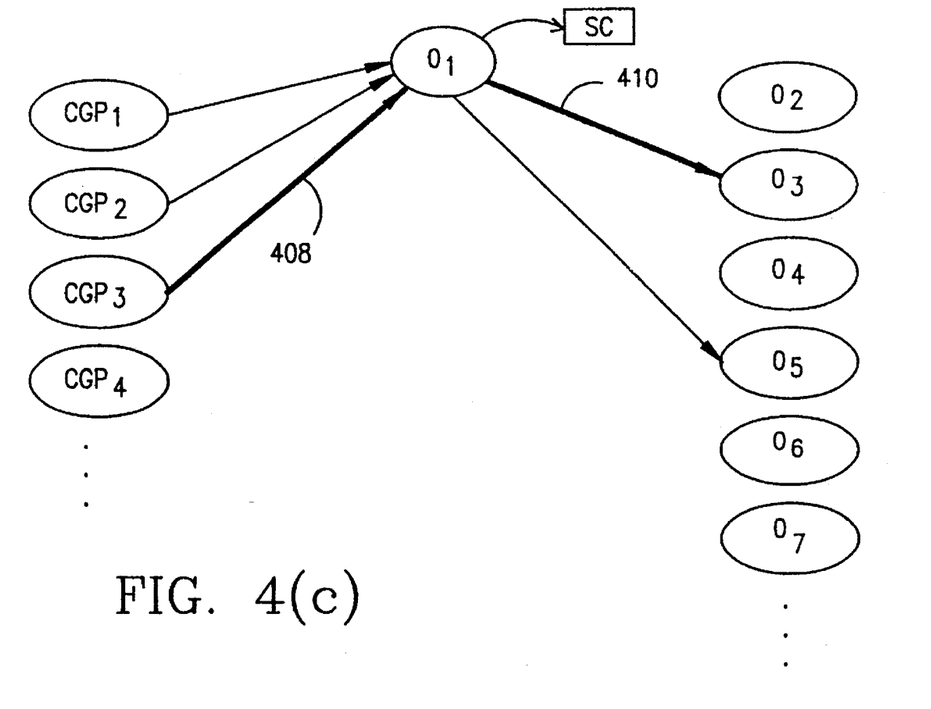

Shown in FIG. 4c is the result of execution of $CGP_2$ searching $O_2$ through $O_7$ for additional connections. As shown, $CGP_2$ finds two additional connections, one to $O_3$, labeled 410, and the other from CGP3 labeled 408, designating another specialty connection process whose execution is desired based on the connection found between $O_1$ and $O_3$. Please note that these connections may have different attributes than connections made by $CGP_1$.

Figure 4D:
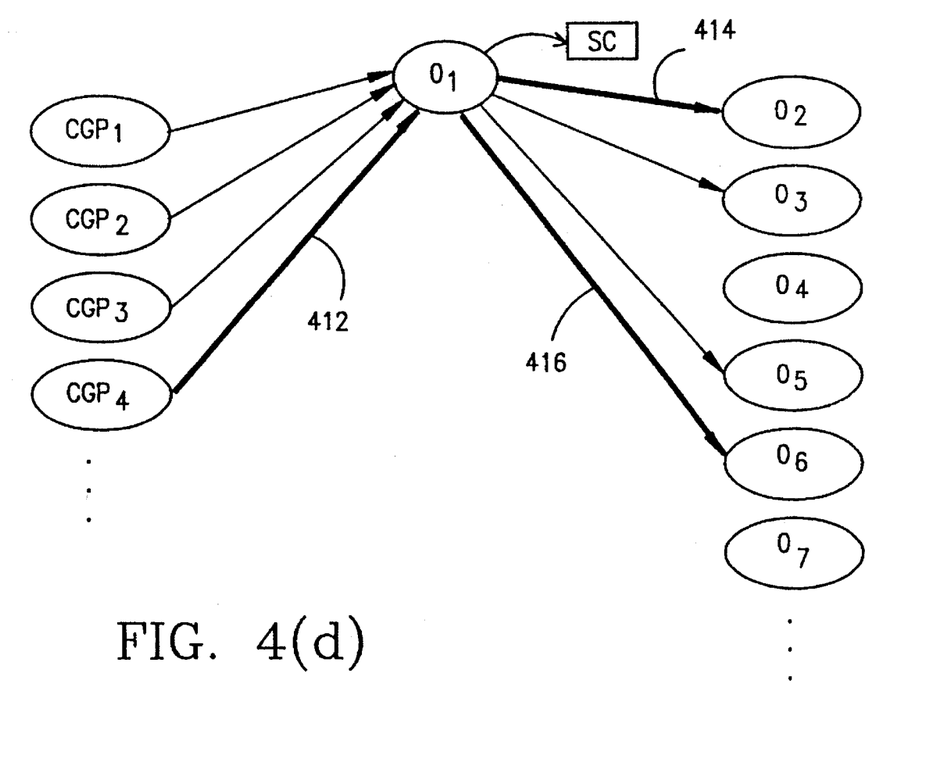

FIG. 4d illustrates the result of the execution of $CGP_3$. As shown, $CGP_3$ creates three additional connections involving $O_1$. The first two, labeled 414 and 416, are additional connections. The third is an additional connection from $CGP_4$. Upon subsequent dispatch, $CGP_4$ may create still more connections to additional connection generating processes and/or objects, or may find no further connections, or may find additional connections involving objects to which connections already exists. In the later case, additional connections may be established to the object. These connections, and indeed all connections, may run between objects generally or may run from/to the particular point of connection. Thus, if the objects are entire documents and a connection involves keyword, the connection may simply "attach" to the documents generally, or may attach within the documents between the connected keyword. Of course, as an object becomes smaller, the distinction narrow, so that for an object consisting of a single word, the distinction disappears.

Figure 5:
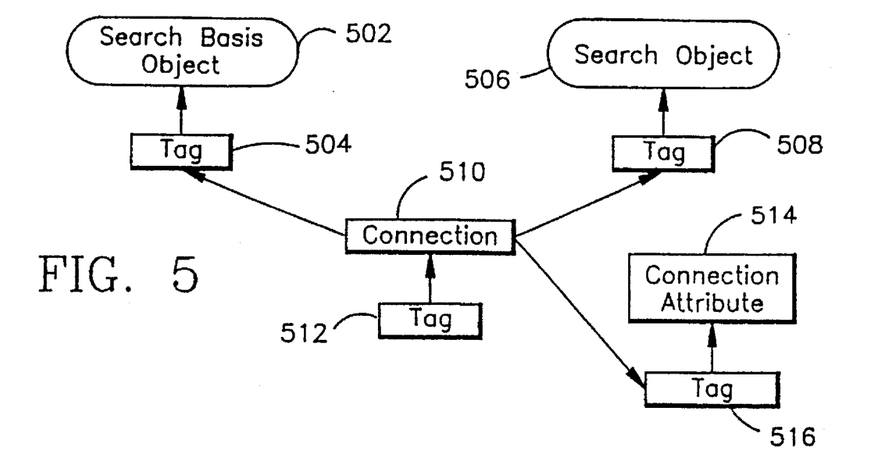
FIG. 5 is a block diagram illustrating the detailed structure of a connection.

FIG. 5 illustrates the detailed implementation of connection structure in accordance with the present invention. The structure includes search basis object 502, tag 504, search object 506, tag 508, connection 510, tag 512, connection attribute 514 and tag 516. In the detailed implementation, the connection structure, involves the used globally unique identifiers called tags, which are discussed more fully in co-pending application UNIVERSAL TAG IDENTIFIER ARCHITECTURE. Every object (including data and process) is given a unique tag. When a connection or connection attribute is created, it too is given a unique tag. To record the connection, tags of the search basis object and the search object are recorded with the connection tag. As will be discussed in greater detail below, the direction of the connection is denoted by recording one tag as a "from" and the other as a "to" tag. By using globally unique identifiers—tags—as the basis for recording and managing connections, any two objects anywhere in an arbitrarily large distributed network can be quickly, easily, and efficiently connected.

Ambiguity of reference, even for two objects with the same name, is not a problem since every tag is unique. Objects can be connected across a network without moving any data, since only the tag is needed to make the connection. Enormous numbers of connections can be recorded using little memory since only tags—not file names or memory addresses or network locations—are recorded. This aspect, coupled with the ability of the invention to exploit idle processor cycles as will be discussed subsequently, enables the invention to implement an exhaustion-based searching strategy.

If a connection searching process or a user desires to attach attributes to a connection, the tag corresponding to the desired attribute is located or generated for the new attributes and a reference is associated with the tag of the connection to which the attribute applies. Thus, as shown in FIG. 5, connection attribute 514 includes its own tag 516 and a reference recorded with connection 510 enabling connection 510 to identify its associated connection attribute 514.

Thus, in FIG. 5, search basis object 502 has its own associated tag 504 while search object 506 has its own tag 508 and connection 510 has its own tag 512. The connection identifies tags 504 and 508 as handles to the object which they in turn identify.

Figure 6A:
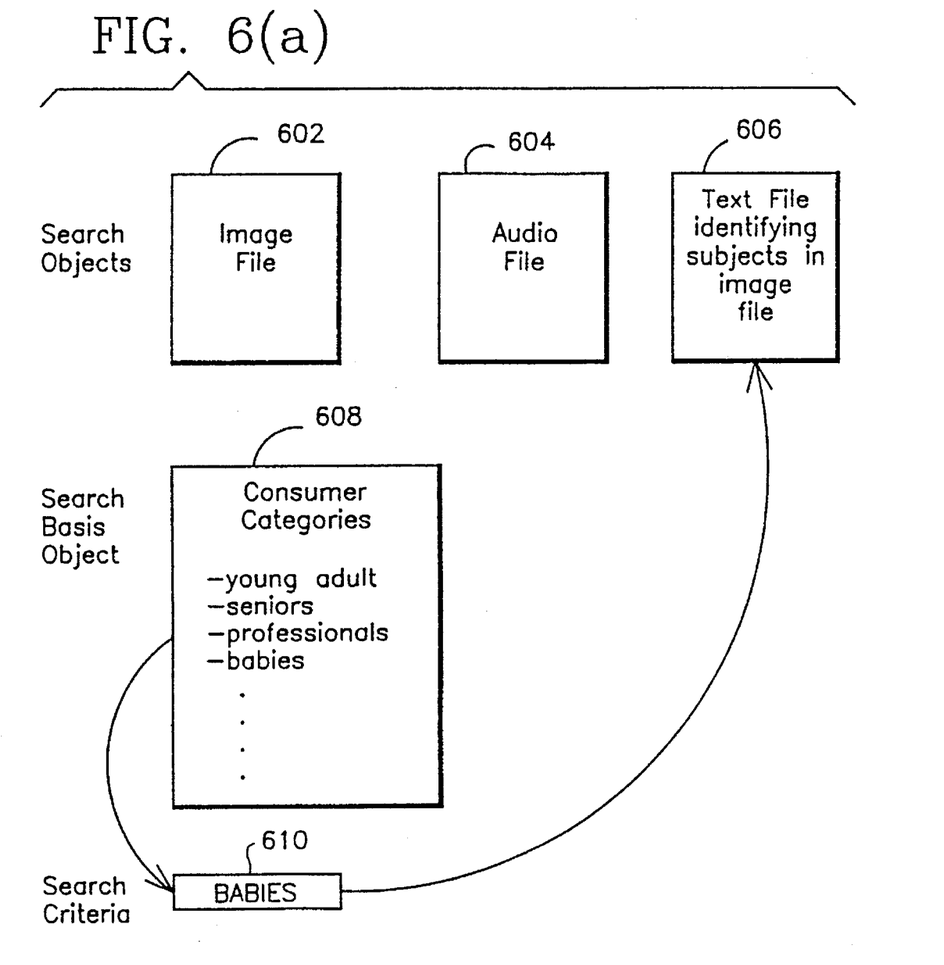
FIGS. 6a, 6b and 6c depict an example of the implementation of generating connections between objects.
Figure 6B:
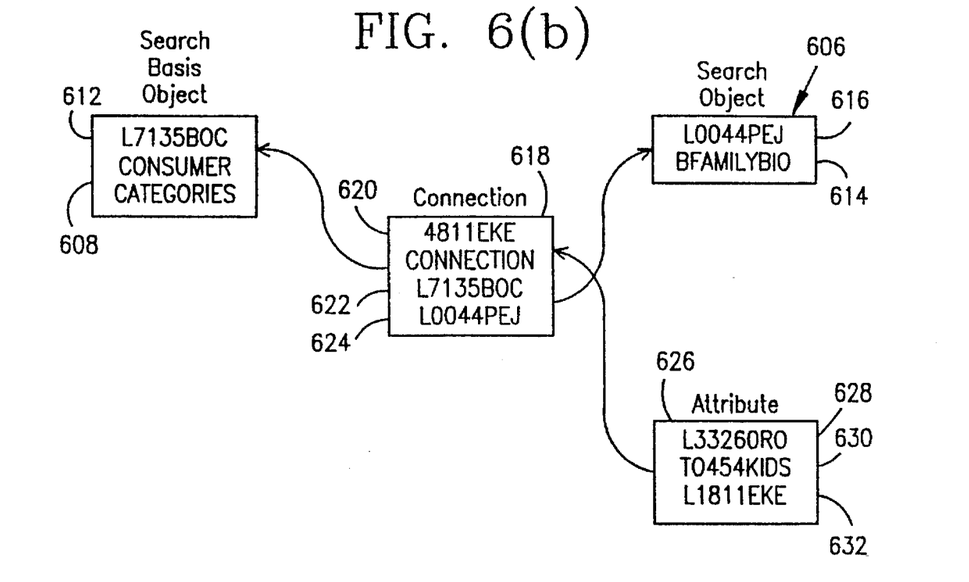
Figure 6C:
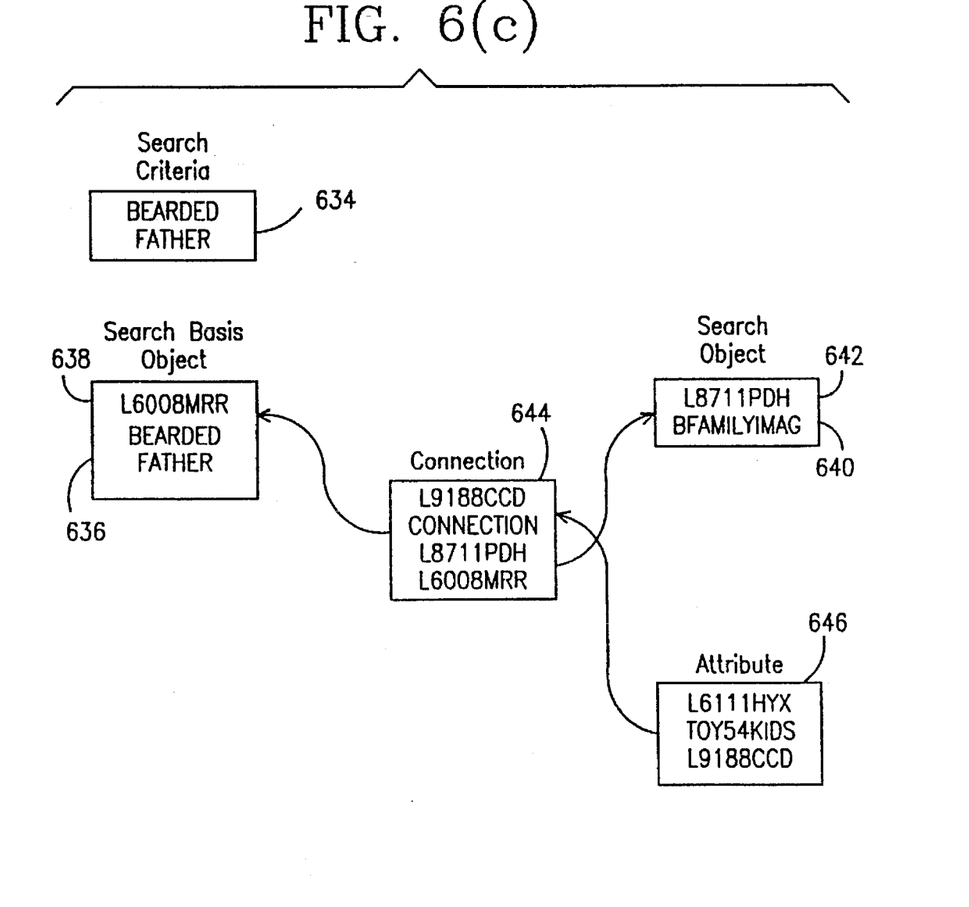

Shown in FIGS. 6a through 6c is a detailed example illustrating the preferred embodiment for the implementation of connections. FIG. 6a shows three related objects; image file 602, audio file 604, and text file 606. For purposes for the example, these three objects are established as the search objects.

An application which may have executed previously provides the search basis object labeled 608. The application may have been designed by a custom catalogue enterprise, for instance, to identify possible patrons to which catalogues will be mailed and to collect information for use in customizing catalogues. Thus, as shown in the example, the search basis object includes a list of consumer categories: young adult, seniors, professionals, babies, etc. In the example, the search criteria of babies shown at 610 is established by the connection generating process of the present invention based on search basis object 608. The search criteria is then applied to text file 606 in an effort to identify instances of the search criteria babies.

FIG. 6b shows the recording of a connection between search basis object 608 and search object 606. Included are tag 612 denoting the point of connection to search basis object 608, search object connection point 614, tag 616 identifying the connection point to the search object, connection 618 including connection tag 620, from connection tag 622, and to connection tag 624, and attribute 626 including attribute tag 628, attribute value tag 630, and attribute connection tag 632. Tags 612, 616, 620 and 628 are the globally unique identifiers, or handles, associated with their objects, connections, and attributes. Thus, it can be seen from FIG. 6b that connection 618 has a "from" tag value of "<7135BOC" which corresponds to search basis object 608. Similarly, connection 618 has a "to" tag value of "<0044PEJ", which corresponds to search object connection point 614. This indicates that the particular connection has been established from consumer categories at 608 to b.family bio at 614.

It is to be noted that the particular connection shown in FIG. 6b is recorded with respect to search basis object 608 consumer categories rather than search criteria 610 "babies" (shown in FIG. 6a). However, the other side of the connection is recorded directly to the data unit in which the search criteria was found, b.family bio identifies by number 614, rather than by a tag associated with the entire text file, which may contain numerous family bio units. If b.family bio did not itself include a tag, one would have been generated for it in order to provide a basis for recording the connection. In general, it is to be noted that the recording of connections to or into objects may be accomplished under direction of the user or the connection generating process, depending upon its analysis of the level at which the connection is most useful. Thus, in the example, if the connection were deemed to be most useful directly connected to "babies" then "babies", could have been used as a search basis object. Alternatively, if the connection were judged to be most useful at a level even higher than the entire search basis object 608, this too could be accommodated.

It is also to be noted, from FIG. 6b, that the arrows indicate pointer references, not the direction of connections. Instead, connection direction is indicated by the convention, the first tag recorded is known as the "from" tag (622 in the example), while the second tag recorded is known as the "to" (624 in the example).

Finally, FIG. 6b shows attribute 626 recorded for the connection to indicate, in this example, that the creator of the connection is "toys for kids" shown at 630. "Toys for kids" may be the marketing enterprise which created the connection generating procedure.

Shown in FIG. 6c is a second connection generated as a result of the first connection. The connection generating process detects that the connected search object b. family bio 614 (FIG. 6b) references an image file containing an image of the family described in the biography. This image file is stored in search object 602 (FIG. 6a). The connection generating process thus creates a second connection (not shown) from a specialty connection generating process to image file 602 for the purpose of identifying additional specific connections available in the image file. The selected search criteria is "bearded father". Shown at 634 FIG. 6c. The image file is searched for patterns indicative of a bearded man using pattern identification software which is not a part of the present invention. The pattern is located, so an additional connection is made, this time between the image file generally, and the bearded father object which is coextensive with the search criteria. This is shown is FIG. 6c at connection 644, which includes a "from" tag identifying search object 640, b.family image, having associated tags 642, and "to" object 636, bearded father, having associated tag 638. Similar to FIG. 6b, attribute 646 is created in association with connection 644 to identify the creator of the connection, enterprise "Toys for Kids".

Given the above information, the enterprise "Toys for Kids" may now be in a position to create a customized catalogue of child's toys which are anticipated to be of interest to children whose fathers have beards. For instance, the models in the catalogue may include bearded men, or the toy selection may included lumber jacks, lumber trucks, etc.

Figure 7:
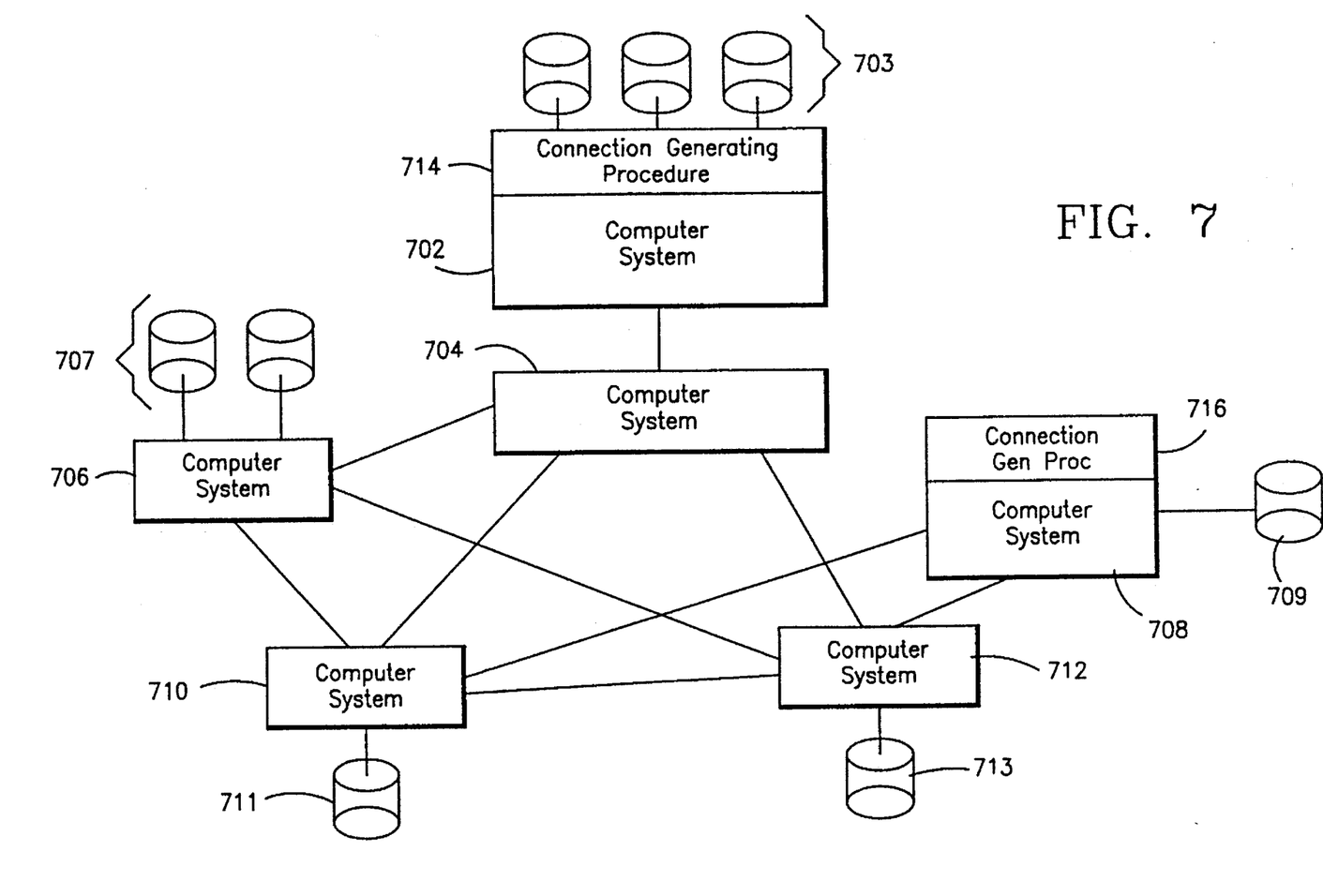
FIG. 7 is a block diagram illustrating a network of connection generators interconnected for operation in accordance with the present invention.

Shown in FIG. 7 is an exemplary figure illustrating specific aspects of the invention relating to generating connections in a computer network having data distributed over the network. The network includes computer systems 702 having data storage bank 703, computer system 704, computer 706 having data storage bank 707, computer system 708 having data storage bank 709, computer system 710 having data storage bank 711, and computer system 712 having data storage bank 713. Additionally, computer systems 702 and 708 include connection generating procedures running on those computer systems labeled 714 and 716 respectfully. Mass storage devices 703, 707, 709, 711 and 713 contain objects—programs, data—which may be related to other objects both on the same system and on other systems in the network.

In accordance with the present invention, connections are generated across the network using exhaustive searching which may be remotely dispatched to execute on systems not themselves having connection generating procedures installed. Exhaustive searching capability is provided by scheduling execution of a connection generating procedure to use otherwise idle CPU cycles. When a connection generating procedure scheduled for dispatch detects that its host processor has CPU time available, the connection generating procedure begins executing. Further, if the scheduled connection generating procedure detects that another computer system in the network has CPU time available, it may transfer itself to that system to begin execution. Since otherwise idle CPU cycles are being used to generate the connections, the system intentionally searches in a non-discriminatory manner to locate every possible connection which may be of interests until all known possibilities are exhausted. Moreover, the process is repeated on intervals as new objects are introduced and existing objects updated. Connections may be generated in response to interactive search requests by users or, in the preferred mode of operation, by using exhaustive searching and idle CPU cycles. Connections are primarily generated in advance of user requests, or queries for them.

Turning in particular to the exemplary network of FIG. 7, it may be desirable to search for connections between an object housed in storage connected to computer system 702 and an object housed in storage connected to computer system 710. The particular connection generating process to be executed is CGP 714 located on computer system 702, but not directly accessible to computer system 710. Assuming a search criteria has been pre-established based on a search basis object stored at computer system 702, the object stored at computer system 710 is designated as the search basis object. Initially, depending on the utilization state of computer system 702 and computer system 710, no searching may be invoked. However, connection generating process 714 begins monitoring, using well known techniques, the utilization states of both system until sufficient idle CPU cycles are detected on one of them to justify commencing the search process. If this state is first detected on computer system 702, connection generating process 714 sends a request over the network to computer system 710 requesting a copy of the search object. When the search object is received, it is searched for instances of the search criteria and connections are recorded as described previously. The tags for these connections are references to the original object at computer system 710. Thus, the copy of the search object at computer system 702 may be discarded as it is no longer needed.. Alternatively, if storage space is plentiful at computer system 702 or if another reason exists to maintain the object at computer system 702, the tags may be referenced to the local copy of the object..

If spare CPU cycles are first detected on the computer system 710, connection generating process 714 sends a copy of itself over the network to computer system 710. Connection generating process 714 is then dispatched on computer system 710 to generate connections which reference the local search object and the search basis object on computer system 702. Upon completion, the connections are sent back over the network to computer system 702.

Using the foregoing specification, the invention may be implemented by standard programming and/or engineering techniques. The resulting programs may be stored on disk, diskettes, memory cards, ROM or any other memory device. For execution, the program may be copied into system memory (RAM) 110 associated with processor 102. One skilled in the art of computer science will readily be able to combine the process created as described above with appropriate general purpose or special purpose computer hardware to create a computer system embodying the invention. While the invention has been particularly described and illustrated with reference to a preferred embodiment, it will be understood by those skilled in the art that changes in the description and illustrations may be made with respect to form or detail without departing from the spirit and scope of the invention.

We claim:

1. A computer-based method for automatically generating and storing connections between objects in advance of queries for them, comprising the steps of:

detecting free processor cycles in a computer system;

invoking, under program control, a process for execution on the computer system to use the free cycles to search for objects which are related to one another;

upon the locating of objects which are related to one another, creating under program control a globally unique identified connection and attribute between the objects;

storing, in computer memory, the globally unique identified connection under program control in logical association with the related objects, and wherein for a given search criteria one or more connections and attributes thereof are iteratively created between every object and every other available related object and stored within computer memory to be available to future queries.

2. The method as recited in claim 1, wherein the free processor cycles are detected by a second computer system.

3. The method as recited in claim 1, further comprising the step of identifiers allowing indirect reference to any one of objects, connections and/or attributes.

4. The method as recited in claim 1, wherein connections are made among sub-parts of the selected objects.

5. The method as recited in claim 4, wherein connections may be made in any direction or number among the selected objects or their sub-parts.

6. A computer-based method for automatically generating and storing connections between objects in advance of queries for them as per claim 1, wherein said objects are located across computer networks.

7. A computer-based method for automatically generating and storing in computer memory connections between objects in advance of queries for them, comprising the steps of:

receiving a program-initiated directive to dispatch a connection locating process;

invoking under program control the connection locating process to search for objects which are related to one another;

a upon the locating of objects which are related to one another, iteratively creating, under program control, a globally unique connection(s), including associated attribute(s), between the objects and storing, in computer memory, the globally unique connection(s) under program control in logical association with related objects, and wherein globally unique identifiers allow indirect reference to any one of objects, connections or attributes.

8. The method as recited in claim 7, wherein connections are made among sub-parts of the selected objects.

9. The method as recited in claim 8, wherein connections may be made in any direction or number among the selected objects or their sub-parts.

10. A computer-based method for automatically generating and storing in computer memory connections between objects in advance of queries for them as per claim 7, wherein said objects are located across computer networks.

11. A computer-based method for generating connections between objects in advance of queries for them, comprising the steps of:

selecting a first search criteria using a search basis object;

searching a set of search objects for instances of the first search criteria;

upon locating the first search criteria in a search object, creating a globally unique connection;

upon locating the first search criteria in a search object, creating a globally unique connection attribute for the connection;

storing, in computer memory, the globally unique connection and connection attribute in logical association with the search basis object and the search object, and wherein a globally unique connection is created between the search basis object and every available search object containing the first search criteria and stored in computer memory for future search queries using said first search criteria.

12. The method as recited in claim 11, further comprising the steps of:

upon locating the first search criteria in a search object, accessing a second search criteria associated with the first search criteria;

searching the search object for instances of the second search criteria;

upon locating the second search criteria in the search object, creating a connection between the search basis object and the search object, and storing the connection in logical association with the search basis object and the search object.

13. The method as recited in claim 11, further comprising the step of identifiers allowing indirect reference to any one of objects, connections and/or attributes.

14. The method as recited in claim 11, wherein connections are made among sub-parts of the selected objects.

15. The method as recited in claim 14, wherein connections may be made in any direction or number among the selected objects or their sub-parts.

16. A computer-based method for generating connections between objects in advance of queries for them as per claim 11, wherein said objects are located across computer networks.

17. A computer-based method for automatically generating and storing connections between objects located across computer networks in advance of queries for them, comprising the steps of:

detecting free processor cycles in a computer system;

invoking, under program control, a process for execution on the computer system to use the free cycles to search for objects located across computer networks which are related to one another;

upon the locating of objects which are related to one another, creating under program control a globally unique identified connection and attribute between the objects;

storing, in computer memory located within the computer network, the globally unique identified connection under program control in logical association with the related objects, and wherein for a given search criteria one or more connections and attributes thereof are iteratively created between a plurality of objects located across computer networks and every other available related object and stored within said computer memory to be available to future queries.

* * * * *

UNITED STATES PATENT AND TRADEMARK OFFICE
CERTIFICATE OF CORRECTION

PATENT NO. : 5,608,900
DATED : March 4, 1997
INVENTOR(S) : Dockter et al.

It is certified that error appears in the above-indentified patent and that said Letters Patent is hereby corrected as shown below:

On the title page, item

[73] "Internationl" should read --International--.

IN THE ABSTRACT

Line 11, after "approach" insert --,--.

Line 19, after "creating" insert --,--.

Col. 1, line 28, after "pending" delete "," and insert therefore --.--.

Col. 2, line 36, after "Information" " insert --.--.

Col. 2, line 64, delete "volume" and insert therefore --volumes--.

Col. 3, line 54, after "failed" insert --to--.

Col. 7, line 4, "Criteria" should read "criteria".

Col. 11, line 54, delete the extra period.

Col. 12, line 59, delete "a".

Signed and Sealed this

Sixteenth Day of September, 1997

*Attest:*

BRUCE LEHMAN

*Attesting Officer*  *Commissioner of Patents and Trademarks*